United States Patent [19]

Helferich

[11] Patent Number: 4,878,947

[45] Date of Patent: Nov. 7, 1989

[54] METHOD FOR MANUFACTURE OF POROUS REFRACTORY ARTICLES

[75] Inventor: Richard L. Helferich, Clayton, Ohio

[73] Assignee: The Duriron Company, Inc., Dayton, Ohio

[21] Appl. No.: 290,815

[22] Filed: Dec. 22, 1988

Related U.S. Application Data

[63] Continuation of Ser. No. 127,654, Dec. 2, 1987, abandoned.

[51] Int. Cl.$^4$ .................... C04B 38/00; C04B 41/91
[52] U.S. Cl. ....................................... 106/75; 106/84; 501/84; 501/80
[58] Field of Search ............... 106/75, 84; 501/84, 501/125, 128, 80; 252/315.5; 423/181, 203, 42; 264/42, 48, 43; 428/312.4, 318.8, 316.6, 689, 697

[56] References Cited

U.S. PATENT DOCUMENTS

| | | | |
|---|---|---|---|
| 1,682,675 | 8/1928 | Horsfield | 264/43 X |
| 1,761,108 | 6/1930 | Desmarquest | 264/43 |
| 1,842,186 | 1/1932 | McBerty | 264/43 |
| 1,880,157 | 9/1932 | Setterberg | 264/63 |
| 3,537,816 | 11/1970 | Moscou | 423/181 |
| 3,762,935 | 10/1973 | Leach | 264/43 X |
| 4,059,658 | 11/1977 | Shoup et al. | 264/43 |
| 4,071,369 | 1/1978 | Kurz et al. | 264/44 |
| 4,133,691 | 1/1979 | Kindt et al. | 106/75 |
| 4,217,408 | 8/1980 | Bergna | 502/263 |
| 4,356,271 | 10/1982 | Francis et al. | 264/43 X |
| 4,357,165 | 11/1982 | Helferich et al. | 106/84 X |
| 4,432,798 | 2/1984 | Helferich et al. | 106/84 X |
| 4,436,538 | 3/1984 | Tomita et al. | 55/482 |
| 4,721,696 | 1/1988 | Kidd | 502/263 X |

*Primary Examiner*—William R. Dixon, Jr.
*Assistant Examiner*—David M. Brunsman
*Attorney, Agent, or Firm*—St. Onge, Steward, Johnston & Reens

[57] ABSTRACT

The alkali metal content of unfired porous ceramic shapes is substantially reduced by treatment with water to remove excess alkali and treatment with a dilute aqueous solution of an ammonium salt, preferably ammonium chloride, to exchange ammonium ion for remaining alkali metal ion, such that, upon firing, porous ceramic articles are produced having improved stability in high temperature and/or temperature-cycled environments.

11 Claims, 4 Drawing Sheets

RATE OF SODIUM REMOVAL DURING COMPLETE LEACHING/RINSE AND ION EXCHANGE ($NH_4Cl$) CYCLE

APPARATUS FOR LEACHING AND ION EXCHANGE OF SODIUM IONS FROM POROUS HYDROGEL BONDED CERAMIC SHAPES

RATE OF SODIUM REMOVAL USING FLOW THROUGH DESIGN AND PROCEDURE OF DEIONIZED WATER RINSE FOLLOWED BY 1% NH$_4$Cl SOLUTION ION EXCHANGE

METHOD FOR MANUFACTURE OF POROUS REFRACTORY ARTICLES

This is a continuation of co-pending application Ser. No. 127,654 filed on Dec. 2, 1987 now abandoned.

BACKGROUND OF THE INVENTION

The present invention relates to ceramic articles and, more particularly, to the manufacture of porous refractory ceramic articles by processes including a procedure for eliminating, prior to the firing of the articles, compounds or components which, while useful and economical in preparing the green or unfired article, detract from the thermal shock resistance and durability of the final fired ceramic article in its intended use.

In the formation of ceramic articles, a wide variety of processes and compositions are available for selection depending upon intended end use of the article and particular considerations regarding ease of processing, economics and the like.

Ceramics are well known for their compositional and dimensional stability under high temperature conditions.

Of late, interest has increased in the development of porous ceramic compositions either for use as filtering elements in aggressive or stringent environments, or for other uses where the stability and durability of ceramics are desired but where a low mass or density also is required or desirable. Processes are known for producing porous ceramic articles, such as by formulation of a precursor composition containing constituents which are burned out during firing to leave behind pores or voids; the use of pre-prepared porous organic foams (e.g., polyurethane) as molds or carrier for liquid ceramic compositions, whereby the foam is burned out during firing to leave behind a porous ceramic in the shape and form of the carrier; and foamable castable ceramic compositions which can be poured into a mold, foamed by virtue of external agents (e.g., air) or in situ gas-generating reactions, set in the porous configuration in the mold, and fired.

A general characteristic of such processes is their expense, generally attributable to the need for numerous processing steps. To minimize this expense, it is generally desirable to employ the lowest cost ingredients possible, and to this end it frequently will be desirable to utilize in the ceramic composition compounds in readily-available (hence, inexpensive) forms, such as alkali metal salts thereof. In other situations, compounds such as these are required in order to bring about particular effects. A particular example of this is found in castable compositions which set as a result of formation of a silicate or aluminosilicate hydrogel (see, e.g., U.S. Pat. Nos. 4,357,165 and 4,432,798, incorporated herein by reference), wherein there are deliberately added to the composition water-soluble forms (e.g., alkali metal salts) of silica and alumina, such as sodium aluminate and sodium silicate.

Although economically expedient or functionally expedient, difficulty arises because compounds of this type at the same time lead to glassy phases in the microstructure of the fired ceramic article which substantially reduce the thermal resistance and durability of the article for which it was supposed to be designed. As a consequence, if use of such compounds is desired, it is necessary to devise a way to eliminate or alter these compounds prior to firing to arrive at a suitably refractory ceramic article.

As will be discussed in further detail hereinafter, the present invention provides a process for removing and/or altering alkali metals or compounds of alkali metals from a green, unfired porous ceramic shape, such that upon firing a refractory porous shape is produced. The invention has particular applicability to shapes prepared from silicate-containing compositions, for example, utilizing silicate-containing binder compositions, but also has applicability to any ceramic composition containing leachable and/or ionicallyexchangeable alkali metals or alkali metal compounds or other compounds which otherwise would lead to formation of glassy phases in fired porous ceramic articles. As will be further described, the process of the invention involves the water leaching of an alkali-containing porous green ceramic, followed by treatment to effect exchange of ammonium ion for sodium ion utilizing dilute solutions preferably of ammonium chloride, but talso of ammonium acetate or bicarbonate or carbonate or hydroxide or sulfate, or mixture of such ammonium salts.

The prior art contains reference to a number of techniques for dealkatization of silicate compositions, although not strictly in the context of preparing refractory ceramic articles. For example, in a paper entitled "Durable Glass By Reconstitution Of Hydratable Sodium Silicate Glasses," published by the American Chemical Society in 1982, Bartholomew, et al. discuss a procedure utilizing either sodium or ammonium nitrate solutions to reduce the alkali content of 12–21% $Na_2O$-containing hydrated sodium silicate glasses by 50% over a several hour treatment period, as well as a more efficient process utilizing a 0.6 molar solution of ammonium nitrate at 80° C. to reduce the alkali content of a 2 mm thick hydrated sodium silicate glass, containing 21% sodium oxide, to about 100 ppm sodium in a 24-hour period.

In U.S. Pat. No. 4,340,642 to Netting, there is disclosed a process wherein aluminum sulfate is used to enrich the surface layer of sodium silicate-derived spherical particles.

In U.S. Pat. No. 3,653,864 to Rothermal, alkali metal oxide-containing glasses are dealklzed by first hydrating the alkali to a hydroxide, preferably by autoclaving, and then by contacting the glass surface with a non-acidic, non-aqueous solvent having a high dielectric constant, such as formamide or dimethyl formamide.

SUMMARY OF THE INVENTION

According to the present invention, a process is provided for producing porous refractory ceramic articles wherein a supportable porous ceramic shape (i.e., green, unfired article) containing excess and/or ionically exchangeable alkali by reason of compounds and compositions used to prepare it, prior to the firing thereof, is treated with water to remove excess alkali and then treated with a dilute solution of an ammonium salt selected from the group consisting of ammonium chloride, ammonium acetate, ammonium bicarbonate, ammonium carbonate, ammonium hydroxide and ammonium sulfate and mixture thereof (hereinafter referred to for ease of reference as ammonium salts) to effect exchange of ammonium ion for remaining alkali ions in said shape. The shape is then fired to produce a porous ceramic article having high refractoriness and, e.g., improved thermal shock resistance, by reason of substantial absence therein of alkali metals and, hence, alkali metal compounds.

The present invention has applicability to treatment of any unfired supportable porous ceramic shape containing excess and/or ionically exchangeable alkali, irrespective of the fundamental composition of the shape or the process used to produce the supportable porous shape. The invention has particular applicability to treatment of supportable porous shapes made by molding or extrusion of foamable ceramic compositions which rely upon an aluminosilicate hydrogel as the binder for the composition or shape, this particular applicability being by reason of the fact that such compositions generally make deliberate and substantial use of alkali metal (e.g., sodium) aluminates and silicates as percursors for forming the ultimate aluminosilicate bond and, hence, exhibit limited refractoriness and thermal shock properties in the fired state by reason of the significant level of alkali. However, the invention has applicability beyond this particular system, as for example in clay-bonded aggregate systems in which alkali metal is present in the clays used to form the adhesive bond (e.g., kaolin, bentonite, etc.), or any other system where the presence of alkali resulting from use of particular components would otherwise lead to limited refractory or thermal shock properties in the fired porous article.

In providing a means for safely, efficiently and effectively removing alkali from porous ceramic shapes and thereby produce fired porous ceramic articles of low alkali content, the present invention offers the significant advantage of permitting one to make liberal use of alkali compounds in forming the unfired shape without concern for the ultimate effect of the alkali on the refractory or thermal shock properties of the fired ceramic. In this way, greater flexibility is provided to the compounder as well as opportunities for improving economics by liberal use of inexpensive starting materials.

The method of the present invention, i.e., treatment of the porous unfired ceramic with water to remove excess alkali, followed by ion exchange with a dilute ammonium salt solution, may be practiced in systems involving recirculation of the treating solutions or in systems utilizing one-pass operations. The invention also makes use in one such embodiment of an apparatus specially designed for treating porous unfired ceramics to remove alkali therefrom.

The invention is further described with reference to the figures and detailed description provided hereinafter.

DETAILED DESCRIPTION OF THE INVENTION

In describing the invention in further detail, reference is made to a particular unfired porous ceramic shape in order to facilitate the description, although, as earlier-noted, the invention is applicable to other porous ceramic shapes made with other compositions or by other processes. In this particular embodiment, then, a porous ceramic shape is manufactured by arranging in a mold of desired configuration a foamable ceramic composition (slurry) containing an alkali metal silicate, alkali metal aluminate, refractory ceramic materials, particulate metal powder (e.g., aluminum) and surfactants. In the mold, reaction occurs between the particulate metal and alkali metal compounds to produce, as a by-product, hydrogen gas bubbles, which bubbles, by reason of the surfactant, are controllably sized and stabilized so as to result in pore formation. At the same time, the alkali metal aluminate and silicate (preferably the sodium forms thereof) also are reacting to form an aluminosilicate hydrogel which sets the composition to a self-supportable shape in the configuration of the mold and binds together all components. Prior to firing, this porous ceramic shape is treated according to the invention to remove alkali therefrom and, hence, increase the refractoriness and thermal shock resistance of the eventual fired porous ceramic article.

With reference to this particular composition, and by way of further explanation, it should be understood that, as formed, the sodium aluminosilicate bond contains an excess of sodium ions (as much as 55%) over the assumed stoichiometric chemical structure (one mole of sodium oxide to one mole of aluminum oxide and two moles of silicon oxide, i.e., $Na_2O:Al_2O_3:2SiO_2:H_2O$).

Figure 3:
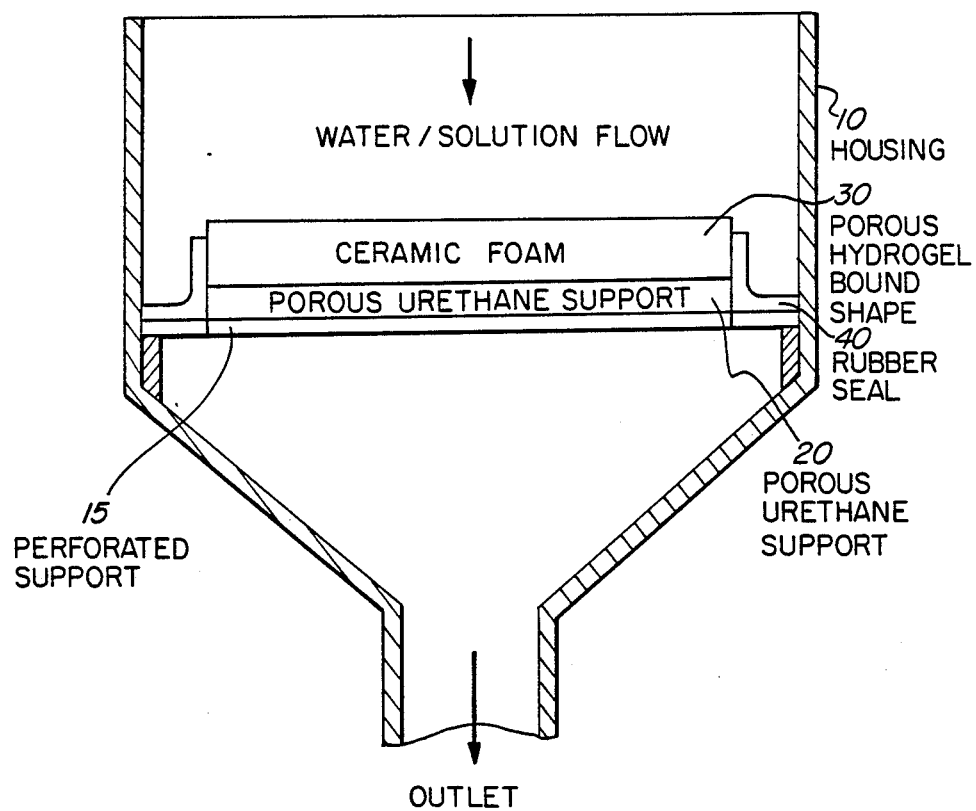
FIG. 3 is a schematic sectional view of an apparatus for effecting rinsing and ion exchange in a porous ceramic shape according to the present invention.

To remove a sufficient amount of this excess sodium in order to improve the refractoriness of the fired article, a three step process was developed which includes: 1) water leaching/rinsing to remove about 55 percent of the sodium present as free sodium hydroxide; 2) an ion exchange process utilizing an ammonium salt solution to remove additional sodium linked to the hydrogel network; and 3) an additional, although optional, water rinse to remove residual anion content. Two techniques were evaluated following the above procedure. The first methd simply used a closed system in which the liquids in each of the above three steps were recycled in a constant volume container, changing the entire solution of one step before going on to the next, thereby allowing the removal of sodium via a diffusion or migration from the molded porous part to the recirculating, i.e., flowing, solution. The second method used a specially designed apparatus, as shown in FIG. 3, in which the water and ion exchange solutions were forced through the molded part with no recirculation. The advantage of the second procedure is in the time required for effecting sodium removal.

Figure 2:
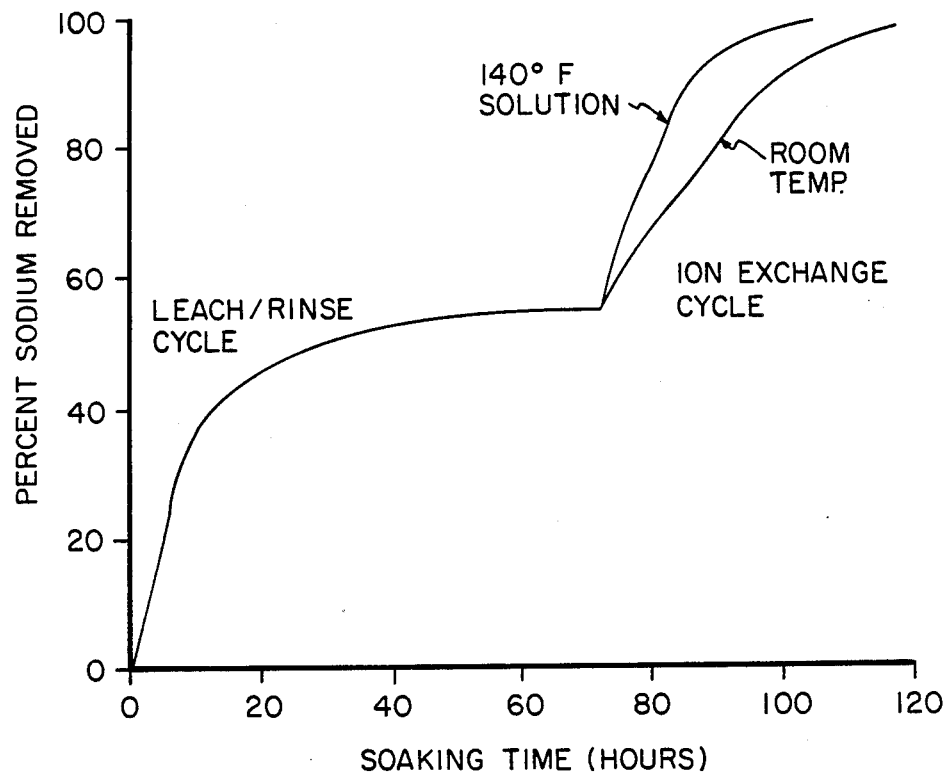
FIG. 2 is a graphical depiction of the rate of sodium removal from a porous ceramic shape utilizing a combined rinsing/ion exchange cycle according to the invention.

The constant volume system was used initially to evaluate the effectiveness of the various sodium removal solutions involving just water, acids (such as hydrochloric and acetic, etc.), other soluble salts (such as aluminum chloride, aluminum sulfate, magnesium chloride, etc.) and ammonium salts. Table I summarizes these initial experiments that were obtained for a porous ceramic plate component with an initial 5 percent sodium oxide content at 0.9 g/cc foamed wet density. As can be seen from the data (see FIG. 2), rinsing/leaching in deionized water for 72 hours without changing the water reduces the sodium oxide content down from the initial 5% level to 2.3-2.4%, i.e., approximately 50%. At this point, the solution was changed to the particular water, acid or salt solution being evaluated to further remove the sodium. Based on the results tabulated in Table I, it was determined that ammonium chloride salt solution is the most effective material evaluated in removing sodium either by direct dissolution or ion exchange.

TABLE I

Summary of Ion Exchange Experiments in a Constant Volume Bath to Remove Sodium from Sodium Aluminosilicate Hydrogel Bonded Porous Plates

| Ion Exchange Medium | Salt or Acid Concentration (wt. %) | Residual $Na_2O$ (%) |
|---|---|---|
| Tap Water | — | 1.77 |
| Deionized Water | — | 1.95 |
| Hydrochloric Acid | .8 | 1.37 |
| Acetic Acid | 1.3 | 1.6 |
| Aluminum Sulfate | 2.4 | 1.1 |
| Aluminum Chloride | 1.0 | 1.8 |
| Magnesium Chloride | 1.0 | 1.6 |
| Ammonium Chloride | 1.7 | 0.15 |

Figure 1:
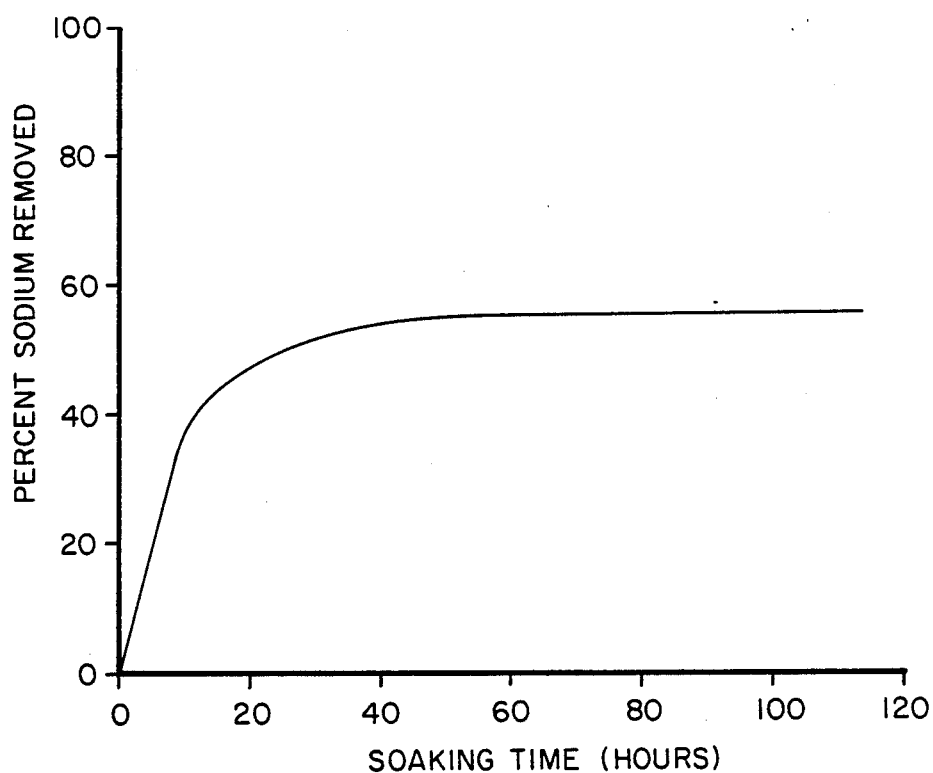
FIG. 1 is a graphical depiction of the rate of removal of sodium from a porous ceramic shape during water rinsing in accordance with the invention.

FIG. 1 illustrates the sodium removal rate during the water leach/rinse cycle, showing that after about 30 hours, the rate of sodium removal approaches zero, i.e., no further sodium removal occurs. Similarly, in FIG. 2, it can be seen that when water leach solution is then followed by an ammonium chloride solution, a rapid increase in the rate of sodium removal is achieved, followed by a decrease in rate after about 30 hours. It also should be noted that heating the ion exchange solution significantly reduces the time required for essentially complete sodium removal as compared to use with a room temperature solution.

A series of further experiments was also performed to determine the optimum amount of ammonium chloride and water in these constant volume tanks with respect to the total amount of sodium being removed. In the work referred to above, 2.6 pounds of ammonium chloride were used to remove (or more precisely ionically exchange $NH_4^+$ for $Na^+$) one pound of sodium oxide. This amount was determined by balancing the following equation:

$$Na_2O + 3NH_4Cl + xH_2O \rightarrow 3NH_4OH + 2NaCl + HCl + (x-2)H_2O$$

To determine whether this 2.6:1 ratio was optimum, experiments were performed comparing a 1.3:1 and 5.2:1 ammonium chloride to sodium oxide ratio to the 2.6:1 ratio. While the lower ratio system displayed slower exchange rates, the higher ratio only provided slightly greater exchange rates and, therefore, was not considered to provide substantial benefit commensurate with the added cost.

In a similar fashion, the amount of water or sodium oxide dilution level was also varied from 75.1 (water to sodium oxide) to 300:1. As before, the lower level was not quite as effective as a 150:1 ratio employed in the work referred to above, with little improvement seen by going to the 300:1 ratio.

Figure 4:
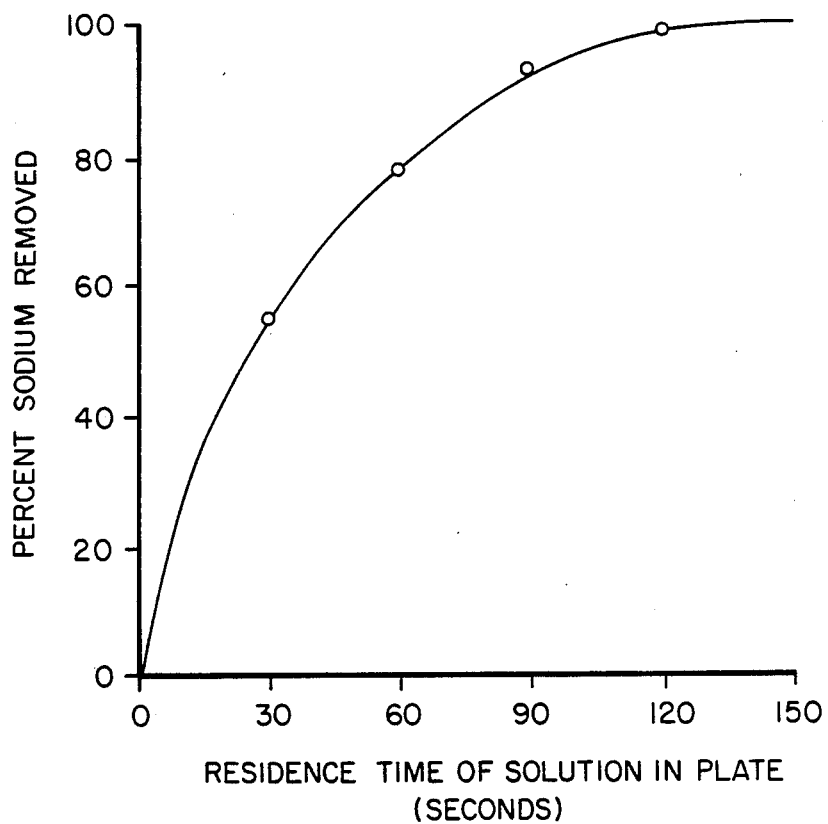
FIG. 4 is a graphic depiction of the rate of sodium removal from porous ceramic shapes utilizing the apparatus of FIG. 3.

The flow through design using a type of apparatus as that illustrated in FIG. 3 has been found to be considerably faster on sodium removal. In this device, shown in open section, a liquid-tight housing 10 having a perforated bottom portion 15, has arranged within it (so as to rest on bottom portion 15) a porous support 20 (e.g., urethane) on which is placed the ceramic foam element 30 to be leached. A rubber seal 40 is arranged to insure that all liquid flow passes through the foam element 30. Table II summarizes the results obtained using this design. The procedure in this case is to pour a given amount of pure water (again, deionized preferred) through the porous cast component until about 55% of the original sodium content is removed i.e., down to the stoichiometric hydrogel composition. After the 45% remaining sodium level is achieved, another quantity of a 1% $NH_4Cl$ solution is poured through the same part until essentially a 100% sodium removal level is obtained. After this ionic exchange step, pure water is again poured through the foam to remove any residual chloride ions. At this point, the sodium content in the part should be less than about 200 ppm as shown in Table II and schematically represented in FIG. 4. The entries in Table II represent sequential steps and the times set forth in Table II are for each particular step, i.e., total time is the total for all sequential steps.

TABLE II

Effect of Leaching (DI Water) and Ion Exchange (1% $NH_4Cl$ Solution) on Residual Sodium Oxide Content in Final Fired Porous Ceramic Plate

| Amt. Liquid (Liters) | Type Liquid | Time To Flow Thru (Sec.) | Est. Amt. Na in Part (g) (1) | % Na Removed (%) | % $Na_2O$ Remaining in Plate (%) (2) |
|---|---|---|---|---|---|
| — | — | — | 28 | 0 | 6 |
| 10 | DI $H_2O$ | 30-35 | 12.3 | 56.1 | 2.7 |
| 10 | 1% $NH_4Cl$ | 35-40 | 6.0 | 78.6 | 1.3 |
| 10 | 1% $NH_4Cl$ | 35-40 | 2.1 | 92.6 | 0.45 |
| 10 | 1% $NH_4Cl$ | 35-40 | 0.1 | 99.5 | 0.02 |
| 5 | DI $H_2O$ | 15-20 | <0.1 | ~100 | <200 ppm |

(1) Based on 10 inch porous plate at 0.86 g/cc wet density (846 g wet weight) with essentially 37.7 g $Na_2O$ initial content.
(2) Based on expected final part weight of 621 g after firing at 2425° F.

Once the final rinse is completed, the parts are allowed to drain and dry. Drying is further enhanced by heating the component in a vented oven (or microwave oven) to about 400°-600° F. At this time, the part is transferred to a high temperature kiln and heated to the required firing temperature to allow the formation of a more homogeneous aluminosilicate ceramic bond in the component microstructure with an associated increase in strength.

Thus, following removal of soluble alkali, the cast article is dried to remove water therefrom and is then fired in any suitable furnace at the temperatures required (e.g., 2200° F. to 2600° F.) to form the shaped porous ceramic article, a generally monolithic structure having porosity. Depending upon the composition of the pourable casting composition and the processing conditions, sintered ceramic refractory articles can be prepared having a broad range of porosity, surface area and the like.

In accordance, then, with the more generalized aspects of the present invention, a supportable unfired porous ceramic shape containing excess and/or ionicallyexchangeable alkali is treated to lower the alkali content thereof prior to firing, and preferably to remove substantially all alkali therefrom, the treatment comprising a first step of water leaching/rinsing to remove a first quantity of excess alkali compounds (e.g., alkali oxides) followed by a second step involving ion exchange using a dilute ammonium salt solution as previously defined, and preferably ammonium chloride, to exchange ammonium ions for alkali ions. Functionally, the amounts of water and ammonium salt employed are simply those effective to achieve the desired reduction in alkali, while the data presented earlier is useful for establishing economically sensible amounts, i.e., ratios to alkali and treatment times. In the preferred embodiment of the invention, a further water rinse is employed to remove any anions from the ammonium salts which can be removed (e.g., chloride ion).

The process according to the invention is efficient as compared to prior art dealkalization processes, and also has the advantage of not using and not forming detrimental by-products or precipitates (e.g., sodium nitrate, ammonium nitrate, nitrogen oxides) as occurs in known processes.

The porous ceramic articles manufactured according to the invention are useful for filtering applications, as kiln furniture, as insulation, as furnace linings, and other like articles where stability under high temperature and/or temperature cycling conditions will be encountered.

The invention is further described and illustrated in the following example.

EXAMPLE

A porous refractory shape was made by casting into a plate-like mold (10-inch diameter plate, ⅜-inch thick) a composition formed from two slurries, one containing sodium silicate, water, surfactant, powdered aluminum, gel strengthening agent, chopped fibers, fused cordierite and calcined kyanite, and the other containing sodium meta-aluminate, water, surfactant, gel strengthening agent, chopped fibers, fused cordierite an calcined kyanite. The composition foamed and set at room temperature to produce a supportable porous (0.86 g/cc) plate of the above-noted dimensions.

At this point the part contained 4.6% sodium oxide and 20.1% water at the above mentioned 0.86 g/cc density. In order to increase the refractoriness, the sodium oxide was then removed. This was accomplished by rinsing the part with 10 liters of purified water (deionized water with a 50,000 ohm resistance or better). This rinse reduced the sodium oxide content to approximately 2%, the stoichiometric amount. To remove the remaining sodium, the part was then subjected to 30-40 liters of a 1% ammonium chloride solution whereby essentially all of the $NH_4^+$ ions replaced the $Na^+$ ions in the plate. An additional 5 liter water rinse was then performed to remove excess $Cl^-$ ions, after which the part was removed and allowed to drain and dry.

After the initial draining and air drying method, the part was heated in a vented oven to 600° F. for six hours to further dehydrate and remove some of the ammonium present. The warm part was removed from the oven and placed directly in a kiln supported on suitable kiln furniture. The part was then slowly heated to the required firing temperature of 2425° F. in 10–12 hours. Once at temperature, the part was held for 2 hours to complete the sintering operation before being allowed to furnace cool.

Using the above formulation and sodium removal procedures, the 10 inch ceramic foamed plate was characterized as follows:

| | |
|---|---|
| Density | 0.63 g/cc |
| Sodium content | less than 0.5% |
| Permeability | 4 inches of water back-pressure at 100 cfm |
| Predominate microstructure | cordierite, mullite |
| Coefficient of expansion | $1.5 \times 10(-6)$ to 700° C. $3.2 \times 10(-6)$ to 1000° C. |
| Modulus of rupture | 400–450 psi |
| Modulus of rupture after 100 cycles from RT to 1250° F. | 380–410 psi |
| Pore structure | 30 pores per linear inch |
| Apparent refractoriness | 2500° F. |

Density, three-point modulus of rupture (MOR) and the coefficient of thermal expansion were measured by standard ASTM techniques. The pore structure (number of complete pore cells per linear inch) was measures using both Scanning Electron Microscope (SEM) and stereographic light microscope photographs. The predominant microstructural phases were determined using X-ray diffraction techniques as well as light microscope observation of polished and etched surfaces. The relative permeability was obtained using a turbine type air blower and recording the backpressure associated with the open celled structure as 100 scfm (standard cubic feet per minute) of air was forced through. Thermal shock resistance was interpreted as the percent of initial MOR strength the ceramic foam retained after exposing the material to 100 thermal cycles between room temperature and 1250° F.

Having described the invention with reference to particular compositions, processes, examples and embodiments, it is to be understood that these particulars are presented for purposes of illustration and description, and are not otherwise intended as strict limitations upon the scope of the fundamental invention as defined in the appended claims.

What is claimed is:

1. A process for lowering the alkali metal content of a porous, unfired, supportable ceramic shape containing alkali metal so as to increase the refractoriness and thermal shock resistance of fired porous ceramic articles made therefrom, comprising the steps of first contacting said porous ceramic shape with water to remove therefrom leachable alkali metal compounds, and thereafter contacting said porous ceramic shape with a dilute aqueous solution of an ammonium salt selected from the group consisting of ammonium acetate, ammonium bicarbonate, ammonium carbonate, ammonium chloride, ammonium hydroxide, ammonium sulfate, and mixtures thereof, to effect exchange of ammonium ion for remaining alkali metal ion in said porous ceramic shape to an extent such that a fired porous ceramic article made from said porous, unfired, supportable ceramic shape contains less than about 0.5 percent by weight alkali metal.

2. The process according to claim 1 wherein, after contact with said dilute solution of said ammonium salt, said porous ceramic shape is contacted with water to remove therefrom residual anions from said ammonium salt.

3. The process according to claim 1 wherein said alkali metal is sodium.

4. The process according to claim 1 wherein said porous ceramic shape comprises a porous aggregate of inorganic ceramic compounds bound by an aluminosilicate hydrogel.

5. The process according to claim 4 wherein said aluminosilicate hydrogel is formed by reaction between an alkali metal silicate and an alkali metal aluminate.

6. A process for lowering the alkali metal content of a porous, unfired, supportable ceramic shape containing alkali metal so as to increase the refractoriness and thermal shock resistance of fired porous ceramic articles made therefrom, comprising the steps of first contacting said porous ceramic shape with water to remove therefrom leachable alkali metal compounds, and thereafter contacting said porous ceramic shape with a dilute aqueous solution of ammonium chloride to effect exchange of ammonium ion for remaining alkali metal ion in said porous ceramic shape to an extent such that a fired porous ceramic article made from said porous, unfired, supportable ceramic shape contains less than about 0.5 percent by weight alkali metal.

7. A process for manufacturing a porous refractory ceramic article, comprising forming, from compounds which contain alkali metal compounds, a supportable, porous ceramic shape, contacting said porous shape with water in an mount and for a time effective to remove leachable alkali metal or alkali metal compounds therefrom, thereafter contacting said porous shape with a dilute aqueous solution of ammonium chloride to effect exchange of ammonium ion for remaining alkali metal ion in said porous shape to an extent such that a fired porous ceramic article made from said porous, unfired, supportable ceramic shape contains less than about 0.5 percent by weight alkali metal, and thereafter firing said porous ceramic shape.

8. The process according to claim 7 wherein said supportable porous ceramic shape is formed from compounds including an alkali metal aluminate and an alkali metal silicate in amounts effective to produce an aluminosilicate hydrogel serving as a binder for said supportable porous shape.

9. The process according to claim 8 wherein said alkali metal is sodium.

10. The process according to any of claims 1, 6 or 7 wherein a fired porous ceramic article made from said porous, unfired, supportable ceramic shape contains less than about 0.02 percent by weight alkali metal.

11. The process according to any of claims 1, 6 or 7 wherein a fired porous ceramic article made from said porous, unfired, supportable ceramic shape contains less than about 200 ppm alkali metal.

* * * * *